Nov. 26, 1935.　　　　M. G. CLAY　　　　2,022,492
PHONOGRAPHIC APPARATUS
Filed April 5, 1932　　　　2 Sheets-Sheet 1
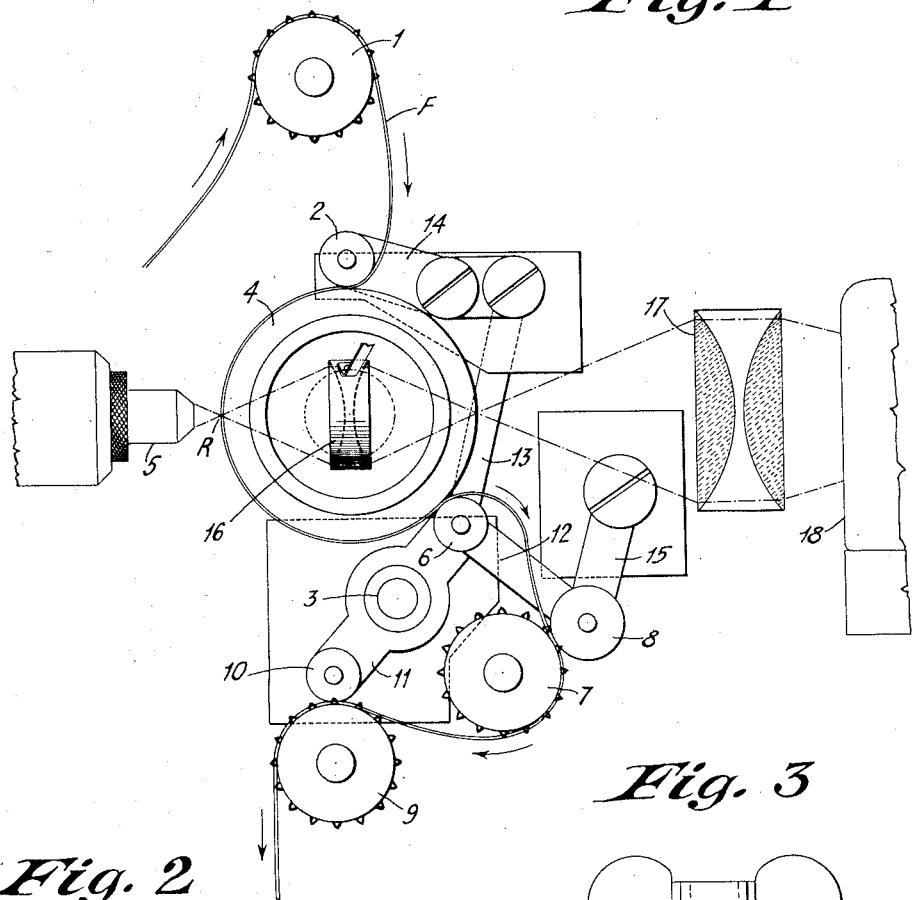
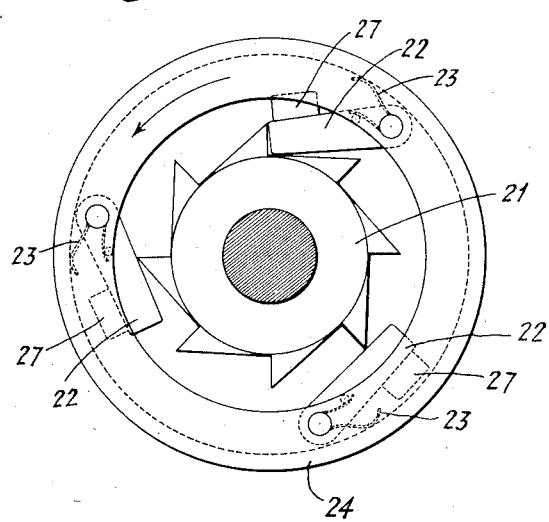
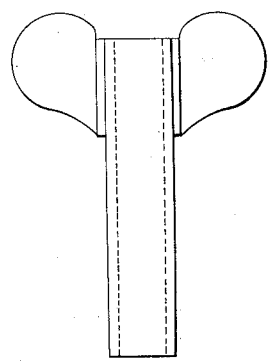
INVENTOR
MURRAY G. CLAY
BY
ATTORNEY

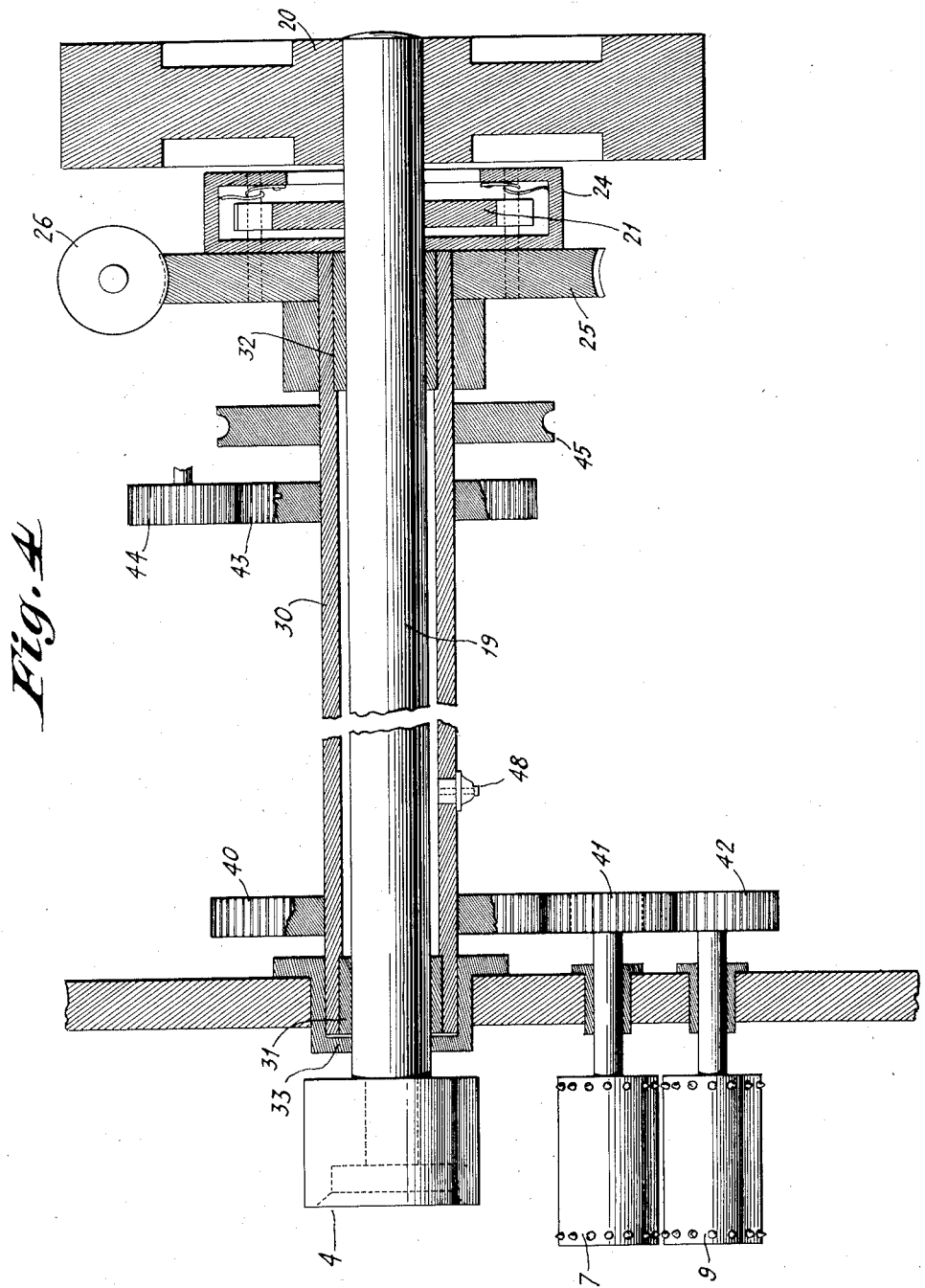

Patented Nov. 26, 1935

2,022,492

UNITED STATES PATENT OFFICE 2,022,492

PHONOGRAPHIC APPARATUS

Murray G. Clay, New York, N. Y., assignor to Radio Corporation of America, a corporation of Delaware Application April 5, 1932, Serial No. 603,257

4 Claims. (Cl. 271—2.3)

The present invention relates to phonographic apparatus and particularly the variety thereof wherein a sound record is either recorded photographically upon film or reproduced photoelectrically from such a film.

This type of apparatus is customarily used in conjunction with motion picture apparatus and for the purpose of reproducing photographic sound records which are recorded upon one edge of the film beside moving pictures. The present invention involves the construction for procuring a perfectly uniform motion of the film past the sound reproducing means irrespective of irregular movements of the driving mechanism caused by intermittent load of the projector or irregularities imparted to the film by either the intermittent feed mechanism or any of the sprockets.

One object of the invention is to provide a means for carrying a film at a uniform velocity past the reproduction point.

Another object of the invention is to provide a flywheel in cooperative relation with the film at the reproduction point.

Another object of the invention is to provide means for supporting such flywheel.

Another object of the invention is to provide such film supporting means and flywheel with bearings which are absolutely frictionless.

Another object of the invention is to provide a means for rotating the film supporting means and the flywheel at a perfectly uniform speed.

In the drawings:

Fig. 1 is a side view of the sound reproducing mechanism.

Fig. 2 is an illustration of the starting clutch.

Fig. 3 illustrates the roller releasing means attached at 3 in Fig. 1.

Fig. 4 is a sectional view on the axis of the film carrying drum.

Referring first to Fig. 1: The film F passes over a pull-down sprocket 1 under a pressure roller 2 and around a drum 4 which carries the film with the soundtrack overhanging its edge and into the path of the light beam focussed thereupon by the objective 5, then under the pressure roller 6 and to the constant speed sprocket 7 upon which it is held by the pressure roller 8 and the hold-back sprocket 9. The pressure rollers 2, 6 and 8 and also the pressure roller 10 which maintains the film in contact with the hold-back sprocket, are connected by link mechanism indicated at 11, 12, 13, 14 and 15 and the key member illustrated in Fig. 3 is attached at 3 so that the clockwise rotation of the key simultaneously releases all of the pressure rollers from their respective contacting positions.

The beam of light after passing through the film at the reproduction point R passes to the lens 16 which condenses the beam and transmits it to the second lens 17 which in turn focusses it upon the photoelectric cell 18.

Referring now to Fig. 4: The film drum 4 is carried upon shaft 19 bearing a flywheel 20 to steady its rotation.

Upon the shaft 19 is mounted a toothed wheel 21 for the purpose of starting its rotation. When stationary, one of the pawls 22 engages one of the teeth of the wheel 21 being pressed thereagainst by one of the springs 23. These pawls 22 are carried in an annular member 24 which is driven by the gear 25 to which rotation is imparted by the main driving worm 26.

When the device is started, the pawls 22 drive the shaft until the entire mechanism is operated at a uniform speed when centrifugal force operating upon the pawls 22 and their weight members 27 causes them to be retracted thereby releasing the wheel 21 from further direct control of the driving mechanism. The springs 23 are made extremely light so that the pawls 22 which are not in actual engagement with the wheel 21 are immediately retracted when rotation commences, and after the device has reached a uniform speed the friction between the pawl which is in engagement with the wheel 21 and the wheel becomes sufficiently slight to permit retraction of that pawl, but, due to the extreme flexibility of the springs 23, the pawl is not again forced into engagement with the wheel 21 on any diminution of speed but remains out of engagement until the entire mechanism has stopped.

The wheel 25 is mounted upon a hollow shaft 30 which rotates at a speed substantially identical with that at which the drum 4 is to rotate, and its shaft 30 carries within it bearing members 31 and 32 which in turn carry the shaft 19. The shaft 19 is also provided with a stationary bearing member 33 serving to additionally steady the movement of the drum 4 but this bearing 33 is so narrow as to have little or no effect upon the total friction involved, the main portion of the load being carried by the bearings 31 and 32.

It will be apparent that since the bearings 31 and 32 are rotating at the same speed as the shaft 19, the friction between shaft 19 and these bearings is zero and, since there is neither friction nor acceleration, the shaft will tend to continue rotating at a perfectly uniform speed.

The sprockets 7 and 9 are driven through a gear train indicated at 40, 41 and 42 from the shaft 30. The usual gear 43, 44 is provided for driving the picture head if the construction is used in conjunction with such an apparatus and a pulley 45 is provided for driving the film take-up reel.

As shown in Fig. 1 the film is bent rather sharply around the pressure rollers 2 and 6 and a sufficient length of film is provided to permit some slack between each of these rollers and its corresponding sprocket. Due to the practically complete lack of friction, after the film drum has reached its normal operating speed the elasticity of the film causes the film to assume the general shape shown in Fig. 1 and this elasticity of the film tends to absorb any sprocket-tooth noise or the like which might be transmitted to the film at the reproduction point if the film were maintained under tension between either of the sprockets and the drum.

An oil film is maintained in the bearings and the viscosity of this serves to damp out irregularities in the motion of the hollow shaft and prevents their being transmitted to the drum shaft while at the same time this viscosity tends to cause the bearings to keep the drum shaft at the proper speed even though there may be some tendency due, for example, to air resistance or to the friction of the pressure rollers 2 and 6 for the shaft to otherwise slow down.

In some cases it will be found of advantage to rotate the bearings at a slightly higher speed than that at which the film is to be driven and this, through the viscosity of the oil serves to overcome any retarding effect due to the pressure rollers or air resistance above referred to, while if the bearings are driven at a still greater speed there will be a slight tension of the film produced on the incoming side. In other cases it may be desirable to have a tension on the film at the outgoing side, in which case the bearings will be driven at a slightly slower speed than that at which the drum rotates. In either of these cases, the speed difference is made so slight that the elasticity of the film maintains it in substantially the form shown in Fig. 1 in order to secure proper absorption in irregularities of motion.

An appropriate means for permitting the insertion of oil into the shaft 30 such, for example, as the spring closed fitting 48 is provided.

It will be apparent that I have provided a construction wherein the mass of the flywheel tends to maintain a uniform rate of movement of the film at the reproduction point and wherein this tendency is not interfered with through the operation of driving mechanism of any kind affecting either the flywheel shaft or the film so that the soundtrack will always traverse the light beam at the reproduction point with perfectly uniform velocity irrespective of slight irregularities in the construction or operation of the driving mechanism.

I claim:

1. Film feeding means for a film-type sound reproducer, including a constant speed driving means having a freely rotatable shaft, a film carrying drum and a flywheel upon the shaft, bearings for the said shaft and means for rotating the bearings at a speed substantially the normal speed of operation of the shaft for maintaining said shaft in rotation.

2. Film feeding means for a film-type sound reproducer, including a constant speed driving means having a freely rotatable shaft, a film carrying drum and a flywheel upon the shaft, bearings for the said shaft and means for rotating the bearings at a speed substantially the normal speed of operation of the shaft for maintaining said shaft in rotation, said bearings being interiorly of a hollow driving shaft.

3. Film feeding means for a film-type sound reproducer, including a constant speed driving means having a freely rotatable shaft, a film carrying drum and a flywheel upon the shaft, bearings for the said shaft and means for rotating the bearings at a speed substantially the normal speed of operation of the shaft for maintaining said shaft in rotation, said bearings being interiorly of a hollow driving shaft, and releasable means for connecting the two said shafts for starting.

4. Film feeding means for sound reproducing apparatus, comprising a momentum member adapted to rotate at a uniform speed and starting means for connecting said momentum member to a source of power including means automatically releasable by centrifugal force when the momentum member has reached a predetermined speed and retracting means for said releasable means providing such retracting force as to cause re-engagement when the speed of the apparatus has become substantially zero.

MURRAY G. CLAY.